United States Patent [19]
Bisgaard et al.

[11] 3,945,255
[45] Mar. 23, 1976

[54] METHOD OF AND APPARATUS FOR MONITORING A PROCESS INVOLVING A PLURALITY OF PARAMETERS

[75] Inventors: Hans Flinker Bisgaard, Hasselager; Benny Aaris Klemar, Soeften, both of Denmark

[73] Assignee: H. Maihak AG, Hamburg, Germany

[22] Filed: Mar. 4, 1974

[21] Appl. No.: 447,714

[52] U.S. Cl. .............................. 73/432 R; 73/115
[51] Int. Cl.[2] ........................................ G08B 23/00
[58] Field of Search .............. 73/115, 133 R, 432 R; 250/231 R; 340/265

[56] References Cited
UNITED STATES PATENTS

| | | |
|---|---|---|
| 2,133,437 | 10/1938 | Dodds ................................. 73/115 |
| 3,345,636 | 10/1967 | McLaren ............................. 346/18 |
| 3,358,150 | 12/1967 | Summer ...................... 250/231 R X |

*Primary Examiner*—Charles A. Ruehl
*Attorney, Agent, or Firm*—Michael J. Striker

[57] ABSTRACT

A process, such as for instance the operation of a machine, is automatically supervised by monitoring at least two of the operational parameters which are desired to have a prescribed relationship to each other. A curve is formed which graphically represents the actual monitored relationship of the parameters, and it is compared to a standard curve representing the desired relationship of the parameters. In the event of a deviation between the curves, a signal is produced to indicate such deviation. An apparatus for carrying out the method is also disclosed.

10 Claims, 4 Drawing Figures

FIG. 1
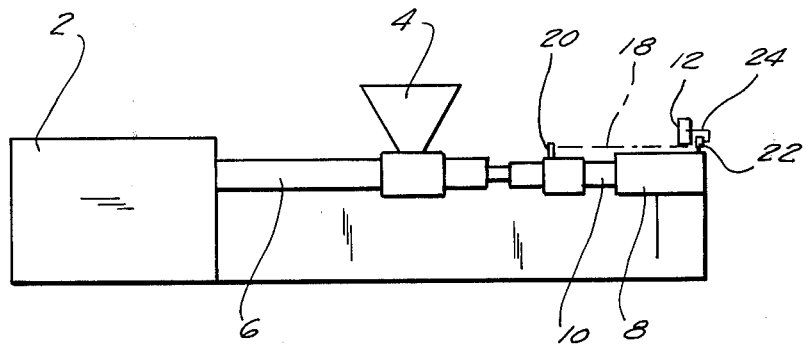
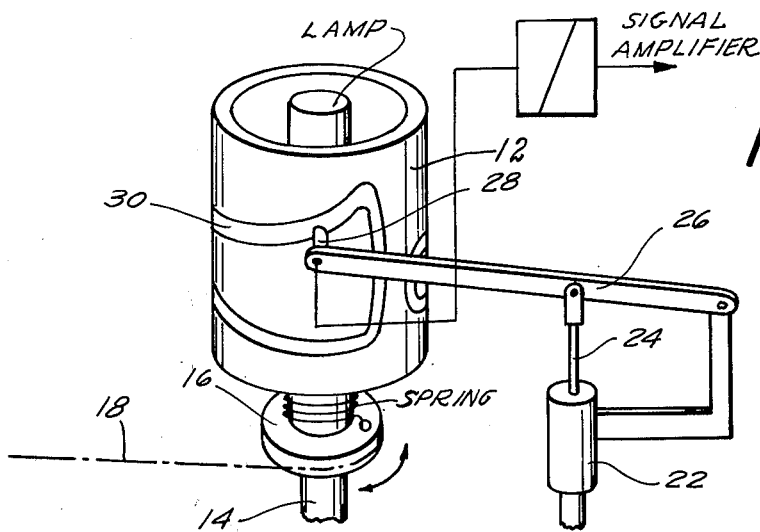
FIG. 2
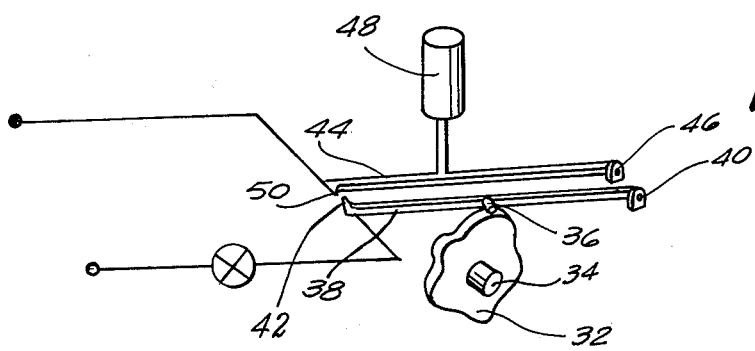
FIG. 3

3,945,255

METHOD OF AND APPARATUS FOR MONITORING A PROCESS INVOLVING A PLURALITY OF PARAMETERS

BACKGROUND OF THE INVENTION

The present invention relates generally to the monitoring of a process involving a plurality of parameters, and more particularly to a method of effecting such monitoring and an apparatus for carrying out the method.

The art already knows of arrangements for automatically monitoring processes involving a plurality of parameters. For instance, it is known to automatically regulate temperatures or liquid levels or the like. It is also known to monitor the operation of machines of various types. Such monitoring involves little or no difficulties when the surveillance problem involved is restricted to monitoring the deviation of a parameter which can vary between two fixed values. An example of this would be if a temperature range is being monitored and it must be detected whether the temperature falls below a minimum permissible temperature at the lower end of the range, or exceeds the maximum permissible temperature at the upper end of the range. The same can be said, by way of example, of monitoring a pressure.

However, when the permissible range of magnitude of a parameter is not constant, or when the character of the magnitude is not constant, but instead is a function of one or more other parameters — such as time —, the problem becomes much more complicated. Where monitoring problems of this type were heretofore involved, the prior art required very complicated equipment, which had to be the more elaborate the more flexible the operation of the equipment was required to be, for instance if the equipment was required to be adjustable so that is could be programmed according to different functional relationships between various parameters.

SUMMARY OF THE INVENTION

It is an object of the present invention to overcome the disadvantages of the prior art.

More particularly, it is an object of the invention to provide an improved method of monitoring a process which involves a plurality of parameters.

An additional object of the invention is to provide an apparatus for carrying out the novel process.

Both the method and the apparatus are to be usable for monitoring of parameters which may vary according to very complex functions.

In keeping with the above objects, and with others which will become apparent hereafter, one feature of the invention resides in a method of monitoring a process which involves a plurality of parameters. In such a method, there are provided the steps of monitoring at least two of the parameters of the process which are desired to have a prescribed relationship to each other. A curve is formed which graphically represents the actual relationship of the parameters to each other, that is the relationship which has been determined by monitoring the two parameters. The thus obtained curve is compared to a standard curve representing the desired relationship of the parameters, that is the optimum relationship from which deviations should desirably not occur. When a deviation between these curves is detected, a signal is produced which may simply be a signal serving to call attention to the deviation, or which may be a signal that produces an automatic correction of the deviation.

The standard curve can be empirically determined by operating the process a number of times under conditions which are known to be optimum, thus producing a curve that can be used as the standard curve for later comparison. However, the standard curve can also be obtained by calculations which will self-evidently be readily possible for those concerned with a particular process that is to be monitored.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic side view illustrating an injection molding machine for synthetic plastic material, which machine is provided with an apparatus according to the present invention;

FIG. 2 is a fragmentary perspective view, illustrating those components of one embodiment of the invention which provide the graphic representations of the parameters being monitored;

FIG. 3 is a fragmentary perspective view, illustrating details of a further embodiment of the invention.

DESCRIPTION OF THE PREFERRED EMBODIMENTS

Figure 4:
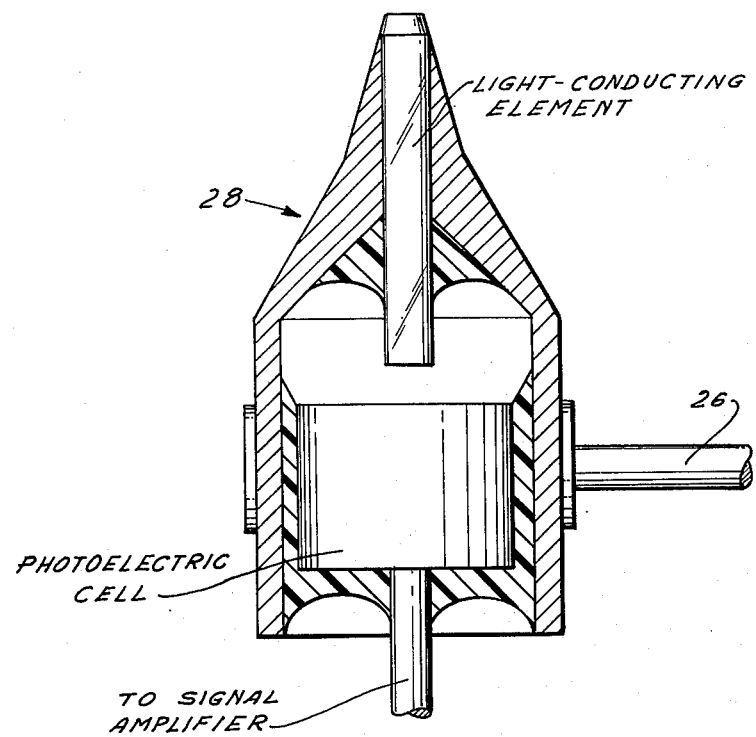
FIG. 4 is an axial section, showing a detail of FIG. 2 on an enlarged scale.

Referring firstly to FIG. 1 it will be seen that in this figure we have illustrated a conventional injection molding machine for injection molding of synthetic plastic material. The reference numeral 2 identifies the actual molding section in which the injection molding takes place. Reference numeral 4 identifies a feed hopper into which synthetic plastic material is introduced. Reference numeral 6 identifies a tube in which a screw (not shown) is located which in conventional manner rotates as well as being axially reciprocable. Reference numeral 8 identifies a cylinder having a piston (not shown) and a piston rod 10 by means of which the screw in the tube 6, with which the piston in the cylinder 8 cooperates, can be reciprocated towards and away from the unit 2. This results in the successive introduction of quantities of synthetic plastic material, that has been received in the tube 6 from the hopper 4 and has been undergoing plastification therein by the rotation of the screw into the unit 2. Usually such material will be heated, but no particular means for this purpose has been shown, since all of these features are well known in the art. In view of the conventionality of this type of equipment, no further details are believed to be required. Reference for further details may, however, be had to the "Plastics Engineering Handbook" of The Society of the Plastics Industry, Inc., published by the Reinhold Publishing Corporation, New York.

Under optimum operating conditions of the equipment shown in FIG. 1, a certain relationship is to exist between the axial displacement or the position of the piston rod 10 and the pressure which exists in the cylinder 8. This prescribed relationship is graphically represented in accordance with the present invention, that is these two parameters (displacement or position of the piston rod 10 and pressure in the cylinder 8) are the ones that are being monitored in this exemplary embodiment. The monitoring is done by providing a recording surface which moves in correspondence with a movable component, i.e. here in correspondence with the piston rod 10, and on which the other parameter, namely the pressure which is recorded in the cylinder 8 by a pressure measuring device of known type, is reproduced to form a curve. The recording surface can move in one direction and of course the element during the recording on the surface must move in a direction normal to this one direction.

FIG. 2 shows one exemplary embodiment of an apparatus for carrying out the invention, and which embodiment is assumed to have been included in the equipment of FIG. 1. It will be seen that here there is provided a cylindrical member 12 which is provided with an outer circumferential surface forming or provided with the recording surface mentioned earlier. The member 12 is turnably mounted on a stationary shaft 14 and is connected with a pulley 16 that can rotate the member 12 in the direction of the doubleheaded arrow. An elongated flexible element 18, such as a rope or the like, is trained about the pulley and is connected with the movable component whose movement is to be monitored, i.e. here with the piston rod 10. Evidently, when the piston rod 10 moves, the movement will be transmitted to the pulley 16 and this will cause the cylindrical element 12 to be turned in one direction when the piston rod 10 moves forwardly (to the left in FIG. 1) in order to cause the screw in the tube 6 to inject plastic material into the unit 2. When the piston rod 10 is retracted, the element 12 is returned in the opposite direction by the illustrated spring which acts between the shaft 14 and the element 12, so that the latter is restored to its starting position.

The cylinder 8 acts upon a pressure receiving cylinder 22 having a non-illustrated piston and a piston rod 24 which moves against the biasing force of a non-illustrated spring and which causes upward and downward movement of a recording arm 26 to which the piston rod 24 is pivoted. The movement of the arm 26, which is also pivoted at its right-hand end to a support as shown, is in correspondence with pressure variations in the cylinder 8, which are sensed by the piston in the cylinder 22. The free end of the arm 26 carries a component 28 which can be a scribing device or the like, as shown in the self-explanatory FIG. 4, and which traces a curve 30 on the cylindrical member 12. This results in a graphic representation of the actually monitored relationship of the two parameters involved, that is the movement of the piston rod 10 on the one hand and the pressure in the cylinder 8 on the other hand.

In normal operation and under optimum conditions the curve 30 should be identical during each operating cycle of the machine shown in FIG. 1. This means that any deviation from the curve 30 is suspect, as being indicative of improper operation of the machine.

The invention provides means for automatically determining such a deviation from the optimum curve which, as outlined earlier, can be obtained either by calculation or empirically by operating the machine during several cycles and under optimum conditions, and recording the curve which then serves as the standard curve against which comparison can be made.

According to the invention the automatic detection of a deviation can be carried out in various ways. One of these would be to make the cylindrical member 12 of transparent or translucent material and to coat it on its outer circumferential surface with an opaque layer of material, for instance an opaque wax, whereupon some of the material corresponding to the standard curve 30 is removed so that light can shine through along the curve 30. In this case, a light source (i.e., the lamp shown in FIG. 2) can be located within the cylindrical element 12, and the component 28 can have a light-conducting element which conducts light to a light-detecting component such as the illustrated photocell or a photoresistor, which in turn can be connected in the illustrated manner with a relay or like signal amplifier, in order to produce an alarm and/or machine-control signal when the intensity of the light which it receives from the light source within the cylindrical element 12 varies, or when the light entirely disappears. This would, of course, occur when the arm 26 and thereby the component 28 travel along a curve which deviates from the standard curve 30 (thus indicating that the actually monitored relationship between the parameters differs from the desired relationship), in which case the component 28 would be located opposite the opaque material of the layer on the element 12, rather than being located opposite the curve 30 where it can receive light.

It is clear that by resorting to the present invention it is possible not only to detect whether a particular parameter, that is in the exemplary embodiment of the pressure in cylinder 8, follows its desired function in the relationship to another parameter, but that it is also possible to set the required tolerances and predetermine them in a purely graphical manner, that is by making the curve 30 as broad as desired along any portion thereof, so that during the actual movement of the component 28 on the arm 26 any deviations of the actual relationship monitored for the parameters which fall within the permissible tolerance range, will not trigger a signal.

Self-evidently, the cylindrical element 12 or any othe element having a corresponding recording surface, for instance a planar surface, can also be moved in response to the variation of any parameter in any other process. For instance, such movement could be in correspondence with time in case of a medical electrocardiogram. For this reason, the term "monitoring a process" as employed throughout this disclosure should be construed very broadly, since the invention is applicable to any process or happening which involves parameters that can be registered or reproduced in terms of movements of the elements 12 and/or 28. A further example would be, for instance, the monitoring of an automatic tool machine, for instance the time required for drilling of a hole, in which case the displacement of the drilling head would be compared with an optimal time/displacement curve as the standard curve.

Coming to FIG. 3 it will be seen that this illustrates a further embodiment of the invention in which a cam 32 is provided having a cam track which represents the standard curve against which comparison of a curve representing the actual monitored relationship of the parameters is to be made. The cam 32 rotates on a shaft 34 with a speed corresponding to the variation of one parameter, for instance a change in time. A follower 36 is provided which transmits the cam variations of the cam 32 to an arm 38 which is pivotably mounted at 40 and which carries at its free end a contact 42. A further arm 44 extends parallel to the arm 38 and is similarly pivotably mounted at 46. The arm 44 is connected with an appropirate gauge 48 (shown only diagrammatically) that measures another parameter; the free end of the arm 44 carries a further contact 50 which is located opposite the contact 42. During the process which is to be monitored, the two contacts 42 and 50 should follow each other, which may be ascertained by for instance direct electrical contact between them. When the contacts move out of engagement, this can trigger a signal, or conversely the contacts may normally not be in engagement and may move into engagement only when the two curves deviate from one another, in which case the electrical contact can be used to trigger a signal. One or both of the contacts 42, 50 may be enlarged in its direction of movement by such an extent that the acceptable tolerance will thereby be defined. Such tolerance will be constant in this case whereas in the embodiment of FIG. 2 the tolerance along the curve 30 may vary.

It is evident that deviations of the measured curve from the standard curve can be determined in other ways than those which have been described above by way of example. For instance, in FIG. 2 the component 28 could be a light source and the light detecting element could be located in the interior of the hollow cylindrical element 12. Again, the component 28 could be replaced by a light beam from a mirror which moves or oscillates in correspondence with variations in the particular parameter involved. The curve representing the standard curve can also be magnetically reproduced on a magnetic carrier, and in this case the component 28 may be a pick-up, for instance a device producing a sound in response to deviation from the standard curve 30, or a device which will cease producing a sound in response to such deviation. A further possibility is to represent both the curve showing the actual monitored relationship of the parameters, and the standard curve, on the screen of a dual-gun cathode ray tube, that is of an oscilloscope, in which case photoelectric detecting means may be provided adjacent the screen which produce a signal when the two curves deviate from one another.

In any case, it is advantageous if the movable components of the apparatus according to the present invention move along two mutually normal axes corresponding to the x-axis and the y-axis of a graph. As a general rule, even the most complicated relationships of different parameters can be graphically produced for purposes of the present invention, so that the range of applicability of the present invention, is very wide, indeed. Generally speaking, the invention produces in effect a model of the optimum mutual variation of process parameters, which model is expressed in form of a curve or otherwise. The actual variation of the parameters is compared with this model and in the event of an impermissible deviation of the actual variation from the model — which model represents the optimum, as pointed out above — an alarm signal and/or a control signal is produced. The control signal can of course be utilized to correct the deviation by acting upon the equipment which is being monitored, or the alarm signal can be used to alert an operator or attendant. It will be appreciated that the possibilities as to the manner in which such a comparison can be made in practice, are almost unlimited.

It will be understood that each of the elements described above, or two or more together, may also find a useful application in other types of constructions differing from the types described above.

While the invention has been illustrated and described as embodied in an apparatus for monitoring a process which involves a plurality of parameters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of monitoring a process which involves a plurality of parameters, comprising the steps of monitoring at least two of the parameters of said process which are desired to have a prescribed relationship to each other; forming a curve which graphically represents the actual relationship of said parameters to each other; comparing the thus obtained curve to a standard curve which represents the desired relationship of said parameters; and producing a signal in the event of a deviation between said curves.

2. A method as defined in clain 1, wherein said standard curve is obtained empirically.

3. A method as defined in claim 1, wherein said standard curve is obtained by calculation.

4. An apparatus for monitoring a process which involves a plurality of parameters, comprising first means for monitoring at least two of the parameters of said process which are desired to have a prescribed relationship to each other; second means for forming a curve which graphically represents the actual relationship of the monitored parameters; third means for comparing the thus obtained curve to a standard curve which represents the desired relationship of said parameters; and fourth means for producing a signal in the event of a deviation between said curves.

5. An apparatus as defined in claim 4, wherein said second means comprises relatively movable elements, and said first means are operative for converting changes in the monitored parameters into proportional movements of said elements.

6. An apparatus as defined in claim 5, wherein said elements are mounted for movement along two mutually normal axes corresponding to the x-axis and the y-axis of a graph.

7. An apparatus as defined in claim 5, wherein said elements include a first member having a recording surface and being mounted for movement in correspondence with variations in one of said parameters, and a second member arranged to trace said recording surface and being mounted for movement in correspondence with variations in the other of said parameters and in a direction transverse to the direction of movement of said first member.

8. An apparatus as defined in claim 7, wherein said first member is a cylindrical body turnably mounted on a stationary shaft and having a circumference provided with said recording surface; said first means comprising a pulley fixedly connected with said body and a flexible element trained about said pulley and adapted to be pulled in a sense turning said pulley is one direction in response to variations in said one parameter; and further comprising a restoring spring acting upon said body counter to said one direction.

9. An apparatus as defined in claim 8, wherein said body is hollow and at least translucent, said surface being coated with an opaque layer formed with said standard curve therein along said layer is translucent; and wherein said third means comprises a light source located within said body and a light detector mounted on and travelling with said second member and responsive to variations in the intensity of light it receives when said second member deviates from said standard curve.

10. An apparatus as defined in claim 4, wherein said second means comprises a first follower which carries an electrically conductive contact which moves in correspondence with said actual relationship so as to form said curve representing the same; wherein said third means comprises a cam mounted on a shaft for rotation and having a cam track, and a second follower engaging said cam track and also carrying an electrically conductive contact which moves in correspondence with said desired relationship so as to form said standard curve, said contacts being adapted to engage one another when said curve and said standard curve deviate from one another; and wherein said fourth means comprises an electrically operated detector which detects the engagement of said contacts with one another.

* * * * *